ated Apr. 11, 1967

3,313,848
ANTHRANILIC ACIDS AND DERIVATIVES
Robert A. Scherrer and Franklin W. Short, Ann Arbor, Mich., assignors to Parke, Davis & Company, Detroit, Mich., a corporation of Michigan
No Drawing. Filed June 18, 1964, Ser. No. 376,201
7 Claims. (Cl. 260—518)

This is a continuation-in-part of copending application Ser. No. 82,185, filed Jan. 12, 1961, now abandoned, and is also a continuation-in-part of copending application Ser. No. 224,502, filed Sept. 18, 1962, now abandoned.

This invention relates to novel halogenated anthranilic acids and esters and to methods for producing the same. More particularly, the invention relates to halogenated anthranilic acids including certain N-(2,3-disubstituted phenyl)anthranilic acids, certain N-(2,3,6-trisubstituted phenyl)anthranilic acids, salts and lower alkyl esters thereof, and methods for the production of the foregoing compounds. The compounds of the invention can be represented by the formula

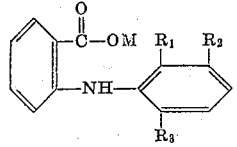

where $R_1$ is halogen, or methyl; $R_2$ is halogen, lower alkyl, lower alkoxy, benzyloxy or $\beta,\beta,\beta$-trifluoroethoxy, at least one of said $R_1$ and $R_2$ being halogen; $R_3$ is hydrogen, halogen, or methyl; and M is hydrogen, a pharmaceutically-acceptable cation, or lower alkyl. In the substituents $R_1$, $R_2$ and $R_3$ of the foregoing formula, the preferred halogen is chlorine, the preferred lower alkyl radical is methyl, and the preferred lower alkoxy radical is methoxy. Some examples of preferred pharmaceutically-acceptable cations are alkali metal, alkaline earth metal, ammonium, and amine cations. In general, the preferred compounds of the invention are the free acids, in which M represents hydrogen. In the lower alkyl esters of the invention, the lower alkyl radicals are alkyl radicals having no more than 7 carbon atoms and are preferably methyl or ethyl.

In accordance with the invention, anthranilic acids corresponding to the above formula and salts thereof can be produced by condensing a benzoic acid derivative of the formula

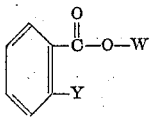

with a compound of the formula

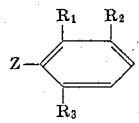

where $R_1$, $R_2$, and $R_3$ have the same significance as given above, W represents hydrogen or an alkali metal (preferably potassium), Y and Z represent —$NH_2$ or halogen, Z being —$NH_2$ when Y is halogen and Z being halogen when Y is —$NH_2$. Bromine is the preferred halogen for Z or Y. The reaction is preferably carried out in the presence of a copper-containing catalyst and a proton acceptor. In carrying out this condensation it is generally satisfactory to employ substantially equivalent quantities of the reactants in the presence of a suitable solvent. Some examples of such solvents are N,N-dimethylformamide, diethylene glycol dimethyl ether, dimethyl sulfoxide, nitrobenzene, and lower aliphatic alcohols such as n-butanol, amyl alcohol, isoamyl alcohol and the like. Preferred solvents are N,N-dimethylformamide and diethylene glycol dimethyl ether. In general, the reaction is favored by temperatures in excess of 75° C. and is preferably carried out at a temperature between 100° C. and 200° C.

Some examples of the copper-containing catalysts which can be used in carrying out the process are various forms of mechanically divided or chemically precipitated metallic copper such as powdered copper or spongy copper and various copper-containing compounds such as cuprous bromide, cuprous chloride, cupric acetate, cupric carbonate, cupric oxide, cupric sulfate and the like. Cupric bromide and cupric acetate are preferred catalysts.

The quantity of the proton acceptor employed in the reaction can be varied within wide limits. In general, a sufficient quantity of proton acceptor should be used to bind the benzoic acid reactant and the hydrohalic acid formed in the course of the reaction. Some of the proton acceptors which can be used when the benzoic acid derivative is employed in free acid form are alkali metal carbonates, preferably potassium carbonate; cupric carbonate; cuprous carbonate and the like. When an alkali metal salt, preferably the potassium salt, of the benzoic acid reactant is employed, the following substances can be used as the protton acceptor: calcium hydride, alkali metal carbonates such as potassium carbonate and tertiary organic amines such as N-ethylmorpholine.

The benzoic acid reactant is advantageously added to the reaction mixture in the form of its preformed alkali metal salt, preferably the potassium salt. Alternatively, the potassium salt of the benzoic acid reactant can be conveniently prepared in situ in a very finely divided condition by adding potassium carbonate to a boiling solution of the free acid form of the corresponding benzoic acid derivative in the solvent employed in the reaction. In the latter case, it is often advantageous to remove most of the water formed in the neutralization by distilling some of the solvent prior to the addition of the catalyst and other reactant.

Also in accordance with the invention, anthranilic acids of the invention and salts thereof can be prepared by hydrolysis of an N-acylated diphenylamine compound of the formula

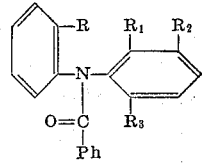

where $R_1$, $R_2$, and $R_3$ have the same significance as given above, R is a cyano, carboxy or carboalkoxy group and Ph is an aryl radical, preferably a phenyl or a phenyl substituted by halogen, nitro, lower alkyl or lower alkoxy groups. The hydrolysis can be carried out either in an acidic or alkaline medium. An alkaline medium is preferred. The hydrolysis in an alkaline medium can be effected by dissolving the N-acylated diphenylamine compound in a watermiscible, non-reactive organic solvent such as ethanol or methanol, adding a large excess of a concentrated aqueous solution of sodium or potassium hydroxide and allowing the hydrolysis to proceed (with or without stirring) until the reaction is complete. The hydrolysis is favored by temperatures in excess of 75° C. and is preferably effected at temperatures ranging from 75° C. to about 150° C. The hydrolysis not only removes the N-acyl group from the acylated diphenylamine compound but also converts the cyano or carboalkoxy group, if present, to a carboxyl group. When alkaline reaction conditions are used, the anthranilic acid compound is present in the reaction mixture in the form of a carboxylate salt while if acidic conditions are used, it is present as the free acid.

Further in accordance with the invention, anthranilic acids of the invention wherein the substituent $R_2$ represents lower alkoxy, benzyloxy, or $\beta,\beta,\beta$-trifluoroethoxy, and salts thereof, can be produced by reacting an anthranilic acid derivative of the formula

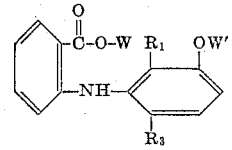

with an alkylating agent, a benzlating agent, or a $\beta,\beta,\beta$-trifluoroethylating agent; where $R_1$ and $R_3$ are as defined before and each of W and W' represents hydrogen or an alkali metal. In general, W and W' both represent an alkali metal; or W and W' both represent hydrogen, in which case the reaction should be carried out in the presence of a base. Some examples of reactants capable of being used in this process are methyl iodide, dimethyl sulfate, ethyl iodide, isopropyl iodide, hexyl iodide, benzyl chloride, and $\beta,\beta,\beta$-trifluoroethyl p-toluenesulfonate. At least approximately one equivalent and preferably a slight or moderate excess of the alkylating, benzylating, or $\beta,\beta,\beta$-trifluoroethylating agent is used; if it is desired to suppress simultaneous conversion of the carboxyl group to an ester group, a larger excess is avoided. A preferred method for carrying out the reaction is by converting the N-(3-hydroxyphenyl)anthranilic acid derivative to a dialkali metal salt in anhydrous dimethylformamide followed by heating with the alkylating, benzylating, or $\beta,\beta,\beta$-trifluoroethylating agent at a temperature of up to about 100° C. for from 1-12 hours, followed by heating the product with an alkali metal hydroxide in aqueous ethanol to hydrolyze any ester which may have formed. The product is isolated directly as a salt or, following acidification, as the free acid. The N-(3-hydroxyphenyl)anthranilic acid derivatives required as starting materials can be obtained by the hydrogenolysis of the corresponding N-(3-benzyloxyphenyl)anthranilic acid derivatives in the presence of palladium catalyst.

Still further in accordance with the invention, anthranilic acid lower alkyl esters of the invention can be produced by reacting an N-(aryl)-anthranilic acid of the formula

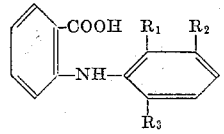

or a reactive derivative thereof with an esterifying agent; where $R_1$, $R_2$, and $R_3$ are as defined before. Some examples of suitable reactive derivatives are the acid anhydride, acid halides, and alkali metal salts of the acid. Some examples of suitable esterifying agents are lower alkanols such as methanol and ethanol, esters of lower alkanols such as methyl bromide, methyl iodide, ethyl iodide and dimethyl sulfate, and diazomethane.

When the esterifying agent is a lower alkanol, the process is preferably carried out by heating the free acid or the anhydride or halide in an excess of the lower alkanol. An acidic catalyst such as hydrogen chloride, sulfuric acid or benzenesulfonic acid is used when the free acid or the anhydride is one of the reactants. Additional solvents such as tetrahydrofuran, dioxane or diethylene glycol dimethyl ether may be present but are not necessary. The reaction is commonly carried out at a temperature in excess of 25° C., preferably at 60-150° C. but not higher than the reflux temperature, and is normally completed within 5 to 100 hours with the free acid or within 1 to 5 hours with the anhydride or a halide.

When the esterifying agent is an ester of a lower alkanol as described above, the process is preferably carried out by heating the anthranilic acid or salt thereof with the selected alkyl halide, dialkyl sulfate, or other alkyl ester derivative in a solvent in the presence of a base. Some examples of suitable solvents are lower alkanols, tetrahydrofuran, dioxane, dimethylformamide, diethylene glycol dimethyl ether, and mixtures thereof. Some examples of suitable bases are alkali metal hydroxides and carbonates, alkaline earth metal hydroxides, alkali metal alkoxides, and, in non-hydroxylic solvents, alkali metal hydrides. At least one equivalent and preferably an excess of the esterifying agent is used. The reaction is usually carried out at a temperature from 25 to 150° C., preferably from 50 to 100° C., and under these conditions it is substantially complete within 24 hours.

When the esterifying agent is diazomethane, the process is preferably carried out in an unreactive solvent such as ether, tetrahydrofuran, diethylene glycol dimethyl ether or dioxane. The reaction proceeds very rapidly and is preferably carried out by treating the free acid with one equivalent or a slight excess of diazomethane at 0 to 25° C., under which conditions the esterification is complete within less than 5 minutes.

Also in accordance with the invention, anthranilic acid lower alkyl esters of the invention can be produced by reacting a compound of the formula

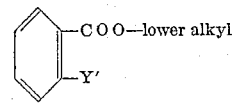

with a compound of the formula

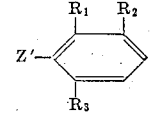

where one of Y' and Z' is halogen, preferably chloro or bromo, and the other is amino; and $R_1$, $R_2$, and $R_3$ are as defined before. When Z' is halogen it is preferably bromo. These reactants are normally employed in approximately equimolar quantities, although a moderate excess of either can be used. High boiling alcohols, hydrocarbons and tertiary amides are suitable solvents, with the reaction being carried out at temperatures of from 75 to 250° C. for from 4 to 24 hours. Satisfactory results can also be obtained by operating somewhat outside of these limits. The process is preferably carried out in the presence of a copper-containing catalyst such as cupric acetate and a weak base such as potassium acetate. In general, competing side reactions are minimized and best yields are obtained when Y' is halogen and Z' is amino.

The compounds of the invention are of value as pharmacological agents. The anthranilic acids and salts of the invention possess a high degree of anti-inflammatory activity and hence are of value in mitigating the symptoms associated with rheumatic, arthritic and other inflammatory conditions. They are preferably administered by the oral route. Either the free acids or pharmaceutically-acceptable salts containing pharmaceutically acceptable cations from a variety of inorganic and organic bases can be used. Some typical examples of such salts are the sodium, potassium, calcium, ammonium, choline, 2-hydroxyethylammonium, bis(2-hydroxyethyl)ammonium, tris(2-hydroxyethyl)ammonium and like salts. Preferred salts are the pharmaceutically-acceptable salts of an alkali metal, an alkaline earth metal, ammonia or a substituted ammonia. The salts or free acids of the invention can be combined with either a solid or liquid carrier or diluent and made available in varying amounts in such conventional vehicles as tablets, capsules, powders, dragees, suspensions and solutions, or other pharmaceutical forms suitable for oral administration. The lower alkyl esters of the invention are pharmacological agents and specifically anti-inflammatory agents, useful in relieving inflammation. They are pharmacologically active on oral administration and for some purposes such as relief of inflammation they can also be administered parenterally. They possess relatively low toxicity, and because of their relatively high solubility in non-polar solvents such as corn oil, can be used to advantage in pharmaceutical forms where high oil solubility is desired. The lower alkyl esters of the invention are also chemical intermediates, and as chemical intermediates they are converted to the corresponding N-(aryl)anthranilic acids and their salts upon hydrolysis.

The invention is illustrated by the following examples.

EXAMPLE 1

A mixture consisting of 27.5 g. potassium o-bromobenzoate, 17.8 g. 2,6-dimethyl-3-chloroaniline, 14.5 ml. N-ethylmorpholine, 60 ml. diethylene glycol dimethyl ether, and 1.0 g. anhydrous cupric bromide is heated in an atmosphere of nitrogen at 155–160° C. for four hours. The reaction mixture is diluted with 60 ml. diethylene glycol dimethyl ether, acidified with 25 ml. concentrated hydrochloric acid and 100 ml. warm water added to the mixture. The mixture is cooled and the desired N-(2,6-dimethyl-3-chlorophenyl)anthranilic acid which crystallizes is collected, digested with methanol, and dried. The product is purified by recrystallization from acetone-water mixture; M.P. 237.5–238° C.

5 g. N-(2,6-dimethyl-3-chlorophenyl)anthranilic acid is dissolved in warm ethanol and one equivalent of potassium hydroxide dissolved in ethanol is added to the solution. The mixture is evaporated to dryness under water pump vacuum to obtain the desired potassium salt of N-(2,6-dimethyl-3-chlorophenyl)anthranilic acid.

EXAMPLE 2

A mixture consisting of 22.7 g. potassium o-bromobenzoate, 16.6 g. 2,6-dichloro-3-methylaniline, 12 ml. N-ethylmorpholine, 60 ml. diethylene glycol dimethyl ether, and 1.0 g. anhydrous cupric bromide is heated in a nitrogen atmosphere at 145–155° C. for two hours. The reaction mixture is diluted with 60 ml. diethylene glycol dimethyl ether and acidified with 25 ml. concentrated hydrochloric acid. The acidic mixture is diluted with 100 ml. of water and the liquid phase decanted from the insoluble oil. The insoluble oil is stirred with methanol and the crystalline N-(2,6-dichloro-3-methylphenyl)anthranilic acid which separates is collected and washed with methanol. The product, after recrystallization from acetone-water mixture, melts at 248–250° C. Another preparation of the same compound had M.P. 257–259° C.

A solution is prepared by dissolving 2.96 g. N-(2,6-dichloro-3-methylphenyl)anthranilic acid in 10 ml. 1 N sodium hydroxide and sufficient ethanol to give a clear solution. The solution is evaporated to dryness to give a residue of the sodium salt of N-(2,6-dichloro-3-methylphenyl)anthranilic acid; M.P. 289–291° C.

A mixture of 2.65 g. choline chloride and 5.8 g. of the sodium salt of N-(2,6-dichloro-3-methylphenyl)anthranilic acid in ethanol is heated to about 70° C. for 5–10 minutes. The sodium chloride which forms in the course of the reaction is removed by filtration and the filtrate concentrated in vacuo to give a residue of N-(2,6-dichloro-3-methylphenyl)anthranilic acid choline salt; M.P. 199–202° C.

EXAMPLE 3

A mixture of 40.5 g. potassium o-bromobenzoate, 20.0 g. 2-methyl-3,6-dichloroaniline, 2.5 g. calcium hydride and 50 ml. diethylene glycol dimethyl ether is placed in a reaction vessel and the vessel flushed with nitrogen. The reaction mixture is heated to 70° C., 2.0 g. cupric bromide added, and the mixture heated to 157° C. over a period of two hours. Sufficient water is added to decompose any unused calcium hydride and the solution made basic with aqueous sodium hydroxide. The solid which precipitates is collected by filtration and the aqueous alkaline solution washed with ether. The alkaline solution is then acidified with concentrated hydrochloric acid and the solid N-(2-methyl-3,6-dichlorophenyl)anthranilic acid which precipitates is collected and purified by recrystallization from ethanol-water mixture; M.P. 232–233° C. The solid product which was filtered from the alkaline solution is dissolved in dimethylformamide and the solution acidified slowly. The product which precipitates is collected, dried, and recrystallized from ethanol-water mixture to obtain an additional quantity of N-(2-methyl-3,6-dichlorophenyl)anthranilic acid; M.P. 232–233° C.

The 2-methyl-3,6-dichloroaniline used as a starting material in the above procedure can be prepared by brominating N-acetyl-2-methyl-3-chloroaniline with bromine in glacial acetic acid to obtain N-acetyl-2-methyl-3-chloro-4-bromoaniline, chlorinating this substance with chlorine in glacial acetic acid to obtain N-acetyl-2-methyl-3,6-dichloro-4-bromoaniline, reducing an ethanol solution of the latter substance using palladium catalyst in the presence of sodium acetate to obtain N-acetyl-2-methyl-3,6-dichloroaniline and removing the N-acetyl group by hydrolysis with aqueous sulfuric acid.

EXAMPLE 4

A mixture consisting of 22.8 g. potassium o-bromobenzoate, 9.5 g. 2,3,6-trichloroaniline, 1.0 g. calcium hydride, and 20 ml. diethylene glycol dimethyl ether is placed in a reaction vessel and the vessel flushed with nitrogen. The reaction mixture is heated to 85° C., 1.5 g. cupric bromide added, and the mixture heated to 150° C. over a two and a half hour period. The reaction mixture is cooled, a small amount of water added to decompose any remaining calcium hydride and the reaction mixture made strongly alkaline with 2 N sodium hydroxide. The alkaline solution is washed with ether, filtered to remove insoluble particles, and acidified with dilute hydrochloric acid. The solid which precipitates is collected, washed several times with hot water to remove any o-bromobenzoic acid and the residual N-(2,3,6-trichlorophenyl)anthranilic acid dried and recrystallized from ethanol-water mixture; M.P. 219–221° C.

EXAMPLE 5

A mixture consisting of 47.8 g. potassium o-bromobenzoate, 32.2 g. 2,3-dichloroaniline, 23.0 g. N-ethylmorpholine, and 100 ml. diethylene glycol dimethyl ether is placed in a reaction vessel which has previously been flushed with nitrogen. The reaction mixture is stirred, 2.0 g. anhydrous cupric bromide is added and the temperature gradually raised to above 140° C. The temperature is maintained at 140° C. or slightly above for one hour and then the hot mixture is acidified with 25 ml. concentrated hydrochloric acid and heated to 110° C. The hot solution is diluted with 150 ml. hot water and cooled. The N-(2,3-dichlorophenyl)anthranilic acid which crystallizes from the solution is collected and washed first with cold ethanol-water mixture and then with ether; M.P. 255–257° C. with sublimation. The product can be recrystallized from diethylene glycol dimethyl ether-water mixture; M.P. 255.5–256.5° C. with sublimation.

5 g. N-(2,3-dichlorophenyl)anthranilic acid is suspended in 30 ml. acetone and 1.86 g. diethanolamine in 20 ml. acetone added with stirring. This clear solution is diluted with 30 ml. petroleum ether and the solution allowed to stand. The diethanolamine salt of N-(2,3-dichlorophenyl)anthranilic acid which crystallizes from the solution is collected and dried; M.P. 105–106° C.

EXAMPLE 6

A mixture consisting of 37.8 g. potassium o-bromobenzoate, 23.0 g. 3-chloro-2-fluoroaniline, 20 ml. N-ethylmorpholine, 2.0 g. cupric bromide, and 75 ml. diethylene glycol dimethyl ether is heated with stirring under a nitrogen atmosphere for one and a half hours at 120–140° C. The hot reaction mixture is acidified with 13.4 ml. concentrated hydrochloric acid and the N-ethylmorpholine hydrochloride removed by filtration. The warm filtrate is diluted with 60 ml. water and cooled. The crystalline N-(2-fluoro-3-chlorophenyl)anthranilic acid which separates is collected and recrystallized first from ethanol and then from benzene; M.P. 209.5–211° C.

EXAMPLE 7

A mixture consisting of 100.5 g. o-bromobenzoic acid and 104.0 g. potassium carbonate in 200 ml. amyl alcohol is heated until the evolution of carbon dioxide ceases. The mixture containing potassium o-bromobenzoate is cooled, the system flushed with nitrogen and 76.0 g. 2-methyl-3-chloroaniline and 5.5 g. copper powder added. The mixture is stirred and heated under reflux for about fifty minutes while removing the water formed during the reaction by means of a water trap. 100 ml. water is added to the reaction mixture and the resulting mixture steam distilled. The solution remaining after the steam distillation is diluted to 500 ml. with water, filtered and the filtrate added to 200 ml. 6 N hydrochloric acid. The N-(2-methyl-3-chlorophenyl)anthranilic acid which separates is collected, recrystallized from absolute ethanol and finally suspended in a mixture of 1 liter cyclohexane and 800 ml. benzene. The cyclohexanebenzene suspension is heated under reflux, cooled and the desired N-(2-methyl-3-chlorophenyl)anhranilic acid collected; M.P. 207–207.5° C.

3 g. of N-(2-methyl-3-chlorophenyl)anthranilic acid is dissolved in hot ethanol, the solution treated with an excess of ammoniacal ethanol and the mixture is evaporated to dryness in vacuo to obtain the desired ammonium salt of N-(2-methyl-3-chlorophenyl)anthranilic acid.

EXAMPLE 8

A mixture consisting of 35.8 g. potassium o-bromobenzoate, 21.2 g. 2-chloro-3-methylaniline, 75 ml. diethylene glycol dimethyl ether, 20 ml. N-ethylmorpholine and 1.5 g. cupric bromide is stirred and heated at about 140° C. for one hour. The hot reaction mixture is acidified with 15 ml. of concentrated hydrochloric acid and the N-ethylmorpholine hydrochloride removed by filtration from the hot solution. The hot filtrate is diluted with 180 ml. water and cooled. The desired N-(2-chloro-3-methylphenyl)anthranilic acid which separates is collected and recrystallized from ethanol and also from benzene; M.P. 218–219° C. with sublimation.

EXAMPLE 9

A mixture consisting of 34.3 g. potassium o-bromobenzoate, 18.3 g. 2,6-dichloro-3-ethylaniline, 2.0 g. calcium hydride, and 50 ml. dimethylformamide is placed in a reaction vessel and the vessel flushed with nitrogen. The reaction mixture is heated to 95° C., 1.5 g. cupric bromide added, and the mixture heated over a period of about two and a half hours to a maximum temperature of 155° C. The reaction mixture is cooled, made acidic with concentrated hydrochloric acid, and 150 ml. water added. Since at this point only an oil appears, the reaction mixture is made basic with sodium hydroxide and the alkaline solution extracted three times with ether. The precipitate which remains in the alkaline solution is collected, stirred with ethanol, and dissolved by the addition of dilute hydrochloric acid to the ethanol. Addition of water to the acidic ethanol solution causes the desired N-(2,6-dichloro-3-ethylphenyl)anthranilic acid to precipitate. The product is collected and recrystallized from ethanol-water mixture; M.P. 205–207° C.

The original alkaline solution is acidified with dilute hydrochloric acid, the precipitate collected, washed with hot water to remove any o-bromobenzoic acid, and the remaining N-(2,6-dichloro-3-ethylphenyl)anthranilic acid recrystallized from ethanol-water mixture; M.P. 205–207° C.

3 g. of N-(2,6-dichloro-3-ethylphenyl)anthranilic acid is dissolved in ethanol, one equivalent of ethanolic sodium hydroxide added to the solution and the mixture evaporated to dryness under water pump vacuum to obtain the desired sodium salt of N-(2,6-dichloro-3-ethylphenyl)anthranilic acid.

The 2,6-dichloro-3-ethylaniline used as a starting material in the above procedure can be prepared by brominating N-acetyl-3-ethylaniline with bromine in glacial acetic acid to obtain N-acetyl-3-ethyl-4-bromoaniline, chlorinating this substance with two equivalents of chlorine in glacial acetic acid to obtain N-acetyl-2,6-dichloro-3-ethyl-4-bromoaniline, removing the bromine atom from the latter substance by catalytic reduction in ethanol solution using palladium catalyst in the presence of sodium acetate to obtain N-acetyl 2,6-dichloro-3-ethylaniline and removing the N-acetyl group by hydrolysis with dilute sulfuric acid.

EXAMPLE 10

N-(2-methyl - 3 - chlorophenyl)-N-benzoyl-anthranilic acid methyl ester (15.0 g.) is dissolved in 250 ml. ethanol, 160 g. 40% sodium hydroxide added and the solution refluxed for two hours. The ethanol is partially removed under reduced pressure, the residue diluted with water, and acidified. The precipitated N-(2-methyl-3-chlorophenyl)anthranilic acid is collected, washed several times with hot water and recrystallized twice from ethanol-water; M.P. 207–207.5° C.

The N-(2-methyl-3-chlorophenyl)-N-benzoyl - anthranilic acid methyl ester used as a starting material can be prepared as follows:

A mixture of 20.0 g. N-benzoyl-2-methyl-3-chloroaniline and 17.0 g. phosphorus pentachloride is stirred at room temperature for two hours and then heated for one and a half hours on a steam bath. The phosphorus oxychloride is removed under reduced pressure by co-distilling with toluene and the iminochloride (imidoyl chloride) is recrystallized from cyclohexane; M.P. 63–64° C. To a cold solution of sodium ethoxide prepared from 3.75 g. 50% sodium hydride and 45 ml. absolute ethanol is added 13.7 g. methyl salicylate. The iminochloride (imidoyl chloride) from above is dissolved in 50 ml. absolute ether and added to the ethanol solution. The mixture is allowed to stand overnight at room temperature, diluted with 200 ml. benzene and washed with water, cold dilute sodium hydroxide, and water. The benzene solution is dried over anhydrous sodium sulfate and the benzene removed under reduced pressure. The product obtained is the oily imidoester (imidate ester), o-carbomethoxyphenyl N-(2-methyl - 3 - chlorophenyl)benzimidate. It is stirred while heating under nitrogen for ten minutes at 275–309° C. and 20 minutes at 266–275° C. to give N-(2-methyl-3-chlorophenyl)-N-benzoylanthranilic acid methyl ester.

EXAMPLE 11

A mixture of 12.1 g. N-benzoyl-2-cyano-2'-methyl-3'-methoxy-6'-chlorodiphenylamine, 58 g. 50% aqueous sodium hydroxide solution and 122 ml. ethanol is heated at reflux for 4 hours. The resulting solution is diluted with water and acidified, and the resulting precipitate of N-(2-methyl-3-methoxy-6-chlorophenyl)anthranilic acid is collected on a filter; M.P. 250–252° C. following crystallizations from aqueous ethanol and then from ethanol.

The starting material can be prepared as follows. Over a period of 5 hours with stirring and external cooling to maintain the temperature at 5–10° C., a solution of 15.4 g. chlorine in 450 ml. carbon tetrachloride is added to a solution of 30 g. 2-methyl-3-mehoxyphenol in 300 ml. carbon tetrachloride. After the addition, the solution is allowed to stand overnight at room temperature, the solvent removed by evaporation, and the residual oil fractionally distilled in vacuo. A fraction of 2-methyl-3-methoxy-6-chlorophenol is collected at B.P. 134–143° C. at 24 mm. This product, 22.5 g., is added in portions to a suspension of 6.9 g. of 50% sodium hydride, mineral oil emulsion, in 45 ml. dry diethylene glycol dimethyl ether. The mixture is warmed to 45° C. to complete formation of the sodium salt. N-(o-cyanophenyl)benzimino chloride, 314 g., is added and the mixture is heated for 1 hour at 120° C., cooled, and poured into 250 ml. of dilute sodium chloride solution. The insoluble N-(o-cyanophenyl)-2-methyl - 3 - methoxy - 6 - chlorophenyl-benzimino ether which separates is collected and triturated with ether; M.P. 160–164.5° C. The latter product is heated in a nitrogen atmosphere at 270° C. for 1½ hours to give N-benzoyl-2-cyano-2′-methyl-3′-methoxy-6′-chlorodiphenylamine, suitable for use without further purification.

N-(o-cyanophenyl)benzimino chloride, also known as N-(o-cyanophenyl)benzimidoyl chloride, is prepared as follows. Below 25° C., 150 g. N²-benzoyl-anthranilamide is added in portions to a solution obtained by the slow addition of 227 g. 2,4,6-collidine to 500 ml. thionyl chloride in an ice bath. The mixture is heated at 70° C. for one hour and concentrated almost to dryness under reduced pressure. The residue is stirred with ether and the ether solution is filtered, concentrated almost to dryness and diluted with petroleum ether. The insoluble product is collected; M.P. 86–87° C. following crystallization from cyclohexane.

EXAMPLE 12

A mixture of 19.2 g. 2,6-dichloro-3-methoxyaniline, 22.7 g. cupric o-bromobenzoate, 12.25 ml. N-ethylmorpholine and 50 ml. dimethylformamide is heated in a nitrogen atmosphere for 2½ hours at 125–145° C. The mixture is cooled, acidified with hydrochloric acid, and diluted with water. The insoluble N-(2,6-dichloro-3-methoxyphenyl)anthranilic acid is collected on a filter. For purification, the product is dissolved in 2 N sodium hydroxide and the solution is filtered, washed with ether, and acidified to reprecipitate the product; M.P. 259–261° C. following crystallizations from aqueous ethanol.

The sodium, calcium, and ammonium salts are obtained by reacting N-(2,6-dichloro-3-methoxyphenyl) - anthranilic acid respectively with sodium carbonate, calcium hydroxide, and ammonia.

The starting material can be prepared as follows. A mixture of 49.1 g. 2,4-dichloro-3-nitrophenol, 98.0 g. anhydrous potassium carbonate, 98 ml. dimethyl sulfate and 500 ml. xylene is stirred and heated at reflux for 2 hours, cooled, and diluted with ether and water. The organic phase is separated, washed with dilute sodium hydroxide solution, with water, and with sodium chloride solution, dried, and evaporated to give a residue of 2,4-dichloro-3-nitroanisole; M.P. 95–97° C. following crystallization from aqueous ethanol. A mixture of 19.8 g. of this product in 400 ml. methanol containing 1 g. Raney nickel is shaken in a hydrogen atmosphere at 25–40° C. under a pressure of 15–30 pounds per square inch until the theoretical amount of hydrogen has been absorbed. The mixture is filtered and the filtrate evaporated to give 2,6-dichloro-3-methoxyaniline, siutable for use without further purification.

EXAMPLE 13

A mixture of 8.15 g. potassium o-bromobenzoate, 7.60 g. 2,6-dichloro-3-benzyloxyaniline, 0.5 ml. N-ethylmorpholine and 1.0 g. cupric acetate in 15 ml. dimethylacetamide is heated and stirred in a nitrogen atmosphere at 100–105° C. for 40 hours. The mixture is diluted with water, made alkaline with 2 N sodium hydroxide and washed with ether. The aqueous solution is filtered and acidified with hydrochloric acid. The insoluble N-(2,6-dichloro-3-benzyloxyphenyl)anthranilic acid which separates is collected on a filter. The mixture is kept hot during the filtration. Following crystallization from acetic acid, the product melts at 231.5–232° C.

The starting material can be prepared as follows. A solution of 49.2 g. 2,4-dichloro-3-nitrophenol in 50 ml. dimethylformamide is treated with 55 g. potassium carbonate and 50 g. benzyl chloride and the mixture slowly heated to 100° C. and maintained at that temperature for one hour. The mixture is then diluted with 50 ml. 3.4 N sodium hydroxide solution and kept at 80° C. for 30 minutes and at room temperature overnight to decompose unreacted benzyl chloride. It is then diluted with 500 ml. water and the insoluble 3-benzyloxy-2,6-dichloronitrobenzene is collected; M.P. 95–96° C. following crystallizations from heptane and ethanol. With stirring, 43.2 g. 3-benzyloxy-2,6-dichloronitrobenzene is added over a period of 1 hour to a solution of 153 g. stannous chloride dihydrate in 164 ml. concentrated hydrochloric acid and 250 ml. ethanol. The mixture is then stirred overnight at room temperature and cooled to 0° C. and the insoluble precipitate which separates is collected and stirred with 2 N sodium hydroxide and ether. The ether solution is separated, washed, dried and evaporated to give a residue of 2,6-dichloro-3-benzyloxyaniline; M.P. 80.5–81.5° C.

EXAMPLE 14

The disodium salt of N-(2,6-dichloro-3-hydroxyphenyl)anthranilic acid is prepared by strring 2.0 g. of the free acid in 12 ml. anhydrous dimethyl-formamide with 0.80 g. 50% sodium hydride in mineral oil. Three grams isopropyl iodide is added and the mixture heated at 100° C. for 5 hours, cooled, diluted with water, acidified, and extracted with ether. The ether solution is washed with water, dried, and evaporated and the residue is heated at reflux for 1 hour with 6 g. of 50% sodium hydroxide in 20 ml. ethanol. The solution is distilled to remove ethanol, diluted with water, and washed with petroleum ether. The aqueous solution is acidified and the insoluble N-(2,6-dichloro-3-isopropoxyphenyl)anthranilic acid is collected; M.P. 166–167.5° C. following crystallization from aqueous ethanol.

The starting material can be prepared as follows. A mixture of 22.2 g. N-(2,6-dichloro-3-benzyloxyphenyl) anthranilic acid, 25 ml. trifluoroacetic acid, 150 ml. dimethylformamide and 2 g. 5% palladium on carbon catalyst is shaken under three atmospheres pressure of hydrogen for 10 minutes, or until the theoretical amount of hydrogen has been absorbed. The mixture is filtered, and the filtrate concentrated to dryness to give N-(2,6-dichloro-3-hydroxyphenyl)anthranilic acid; M.P. 244–245° C. following crystallization from benzene.

EXAMPLE 15

N-(2,6-dichloro-3-hydroxyphenyl)anthranilic acid, 2.5 g., is converted to the disodium salt by reaction with sodium hydride in dimethylformamide. A mixture of the disodium salt, 12 ml. dimethylformamide and 3.2 g. ethyl iodide is heated at 100° C. for 4 hours. 15 ml. of ethanol and 5 g. of 50% sodium hydroxide is added. The mixture is heated at reflux for 1 more hour, diluted with water and washed with ether-petroleum ether. The aqueous solution is acidified and the insoluble N-(2,6-dichloro-3-ethoxyphenyl)anthranilic acid which separates is collected; M.P. 199.5–201.5° C. following crystallizations from aqueous ethanol, benzene-hexane, and ethanol.

Five grams N-(2,6-dichloro-3-ethoxyphenyl)anthranilic acid is dissolved in warm ethanol and the solution treated with a slight excess of methylamine in ethanol. The mixture is evaporated to dryness to give a residue of the methylamine salt of N-(2,6-dichloro-3-ethoxyphenyl) anthranilic acid.

EXAMPLE 16

The disodium salt of N-(2,6-dichloro-3-hydroxyphenyl)anthranilic acid is prepared by stirring 2.0 g. of the free acid in 12 ml. anhydrous dimethyl-formamide with 0.80 g. 50% sodium hydride in mineral oil. Hexyl iodide, 3.78 g., is added and the mixture is heated at 100° C. for 4 hours, cooled, diluted with water, acidified and extracted with ether. The ether solution is washed, dried, and evaporated and the residue is heated at reflux for 2 hours with 30 ml. ethanol containing 5 g. 50% sodium hydroxide solution. The mixture is concentrated by distillation, diluted with 200 ml. water, washed with petroleum ether and acidified with hydrochloric acid to give a precipitate of N-(2,6-dichloro-3-hexyloxyphenyl)anthranilic acid; M.P. 129–130° C. following crystallization from hexane.

EXAMPLE 17

The disodium salt of N-(2,6-dichloro-3-hydroxyphenyl)anthranilic acid is prepared by stirring 4.57 g. of the free acid, 1.50 g. 50% sodium hydride and 25 ml. dimethylformamide. With continued stirring, 11.7 g. $\beta,\beta,\beta$-trifluoroethyl p-toluenesulfonate is added and the mixture is heated at 100° C. for 10 hours, cooled, diluted with water, acidified and extracted with ether. The ether solution is separated, washed, dried, and evaporated and the oily residue is heated at reflux for 30 minutes with 13 g. of 50% aqueous sodium hydroxide and 50 ml. of ethanol. The ethanol is removed by distillation under reduced pressure and the remaining mixture is diluted with water, washed with petroleum ether, and acidified. The insoluble N-[2,6-dichloro-3-($\beta,\beta,\beta$-trifluoroethoxy)phenyl]anthranilic acid is collected; M.P. 177–179° C. following crystallizations from aqueous ethanol, ethanol, cyclohexane-methanol, and benzene-hexane.

EXAMPLE 18

A mixture of 9.7 g. potassium o-bromobenzoate, 10 g. 2,3-dibromoaniline, 5.1 ml. N-ethylmorpholine, 0.5 g. cupric bromide and 30 ml. diethylene glycol dimethyl ether is heated and stirred in a nitrogen atmosphere at 135–145° C. for one hour. The mixture is diluted with 30 ml. diethylene glycol dimethyl ether and treated successively with 15 ml. concentrated hydrochloric acid and 60 ml. water. The mixture is then chilled and the insoluble N-(2,3-dibromophenyl)anthranilic acid is collected; M.P. 245–247° C. following crystallization from aqueous acetone.

By the foregoing procedure, with the substitution of 8 g. of 2,6-dimethyl-3-bromoaniline for the 2,3-dibromoaniline, the product obtained is N-(2,6-dimethyl-3-bromophenyl)anthranilic acid; M.P. 235–237° C.

EXAMPLE 19

A mixture of 54.1 g. N-(2,3-dichlorophenyl)anthranilic acid, 500 ml. methanol and 50 ml. concentrated sulfuric acid is heated under reflux for ten hours. The reaction mixture is cooled and diluted with 400 ml. water and the insoluble product is collected on a filter and washed thoroughly with water. This product is a mixture of the methyl ester of N-(2,3-dichlorophenyl)anthranilic acid with the corresponding free acid. For purification, this product is extracted with ether and the ether solution is washed with 1 N sodium hydroxide and with water, dried, and evaporated to yield the methyl ester; M.P. 86–88° C. after crystallization from petroleum ether.

EXAMPLE 20

A mixture of 60 g. N-(2,3-dichlorophenyl)anthranilic acid, 600 ml. absolute ethanol and 60 ml. concentrated sulfuric acid is heated under reflux for 72 hours. The solution is cooled and poured into 2 liters ice water. The aqueous mixture is extracted with ether and the ether solution is washed with several portions 0.5 N sodium hydroxide, dried and concentrated to give the crude ethyl ester of N-(2,3-dichlorophenyl)anthranilic acid; M.P. 69–71° C. following crystallization from petroleum ether.

By the foregoing procedure, with the substitution of 600 ml. n-propanol for the ethanol, the product obtained is the n-propyl ester of N-(2,3-dichlorophenyl)anthranilic acid.

EXAMPLE 21

A mixture of 20 g. N-(2,3,6-trichlorophenyl)anthranilic acid, 200 ml. absolute methanol, and 20 ml. concentrated sulfuric acid is heated under reflux for 40 hours. The heavy precipitate consisting primarily of the methyl ester of N-(2,3,6-trichlorophenyl)anthranilic acid is collected on a filter and dissolved in ether. The ether solution is washed with 0.5 N sodium hydroxide, with water, and with saturated sodium chloride solution, and then dried over sodium sulfate, filtered and evaporated under reduced pressure. For further purification, the residue of the methyl ester is crystallized twice from cyclohexane; M.P. 118–121° C.

The methyl ester of N-(2,3,6-trichlorophenyl)anthranilic acid is also produced by heating the acid chloride of N-(2,3,6-trichlorophenyl)anthranilic acid in methanol solution for one hour under reflux or by heating the anhydride of N-(2,3,6-trichlorophenyl)anthranilic acid in methanol solution containing a catalytic amount of concentrated sulfuric acid for four hours under reflux. The acid chloride of N-(2,3,6-trichlorophenyl)anthranilic acid is prepared by heating N-(2,3,6-trichlorophenyl)anthranilic acid with thionyl chloride in an excess of petroleum ether solvent at a temperature of under 100° C. The anhydride of N-(2,3,6-trichlorophenyl)anthranilic acid is prepared by converting N-(2,3,6-trichlorophenyl)anthranilic acid to its sodium salt by neutralization with sodium hydroxide and then warming the sodium salt with an equal weight of the acid chloride of N-(2,3,6-trichlorophenyl)anthranilic acid for one hour at 30° C. in dimethylformamide solution.

EXAMPLE 22

A solution of 10 g. N-(2,3,6-trichlorophenyl)anthranilic acid in 200 ml. ether is treated at 15° C. with a solution of diazomethane in ether, added in small portions until a yellow color persists and vigorous foaming ceases. The solution is allowed to stand at room temperature overnight and is then washed with saturated sodium bicarbonate solution. The ether solution is separated, dried over potassium carbonate, filtered, and evaporated under reduced pressure to give a residue of the methyl ester of N-(2,3,6-trichlorophenyl)anthranilic acid; M.P. 118–121° C. following crystallization from cyclohexane.

EXAMPLE 23

A suspension of 500 mg. N-(2,6-dichloro-3-methylphenyl)anthranilic acid, 20 ml. methanol, 600 mg. potassium carbonate, and 1 ml. methyl iodide is stirred and heated under reflux for one hour. The reaction mixture is cooled to room temperature, stirred with an additional 2 ml. methyl iodide for one more hour, poured into water and extracted with ether. The ether solution is washed with saturated sodium bicarbonate solution and with several portions of water, dried over sodium sulfate, filtered and evaporated under reduced pressure to give a residue of the crude methyl ester of N-(2,6-dichloro-3-methylphenyl)anthranilic acid; M.P. 120–121° C. following crystallization from hexane solution at −80° C. Another preparation of the same compound had M.P. 131–132° C. following crystallization from dimethylformamide.

By the foregoing procedure, with the substitution of an equivalent amount of N-(2,6-dichloro-3-ethylphenyl)anthranilic acid for the N-(2,6-dichloro-3-methylphenyl)anthranilic acid, the product obtained is the methyl ester of N-(2,6-dichloro-3-ethylphenyl)anthranilic acid.

By the foregoing procedure, with the substitution of an equivalent amount of N-(2,6-dimethyl-3-chlorophenyl)anthranilic acid for the N-(2,6-dichloro-3-methylphenyl)anthranilic acid, the product obtained is the methyl ester of N-(2,6-dimethyl-3-chlorophenyl)anthranilic acid.

By the foregoing procedure, with the substitution of equivalent amounts of N-(2-methyl-3,6-dichlorophenyl)anthranilic acid, ethanol, and ethyl iodide for the N-(2,6-dichloro-3-methylphenyl)anthranilic acid, methanol and methyl iodide, the product obtained is the ethyl ester of N-(2-methyl-3,6-dichlorophenyl)anthranilic acid.

EXAMPLE 24

A mixture of 18.3 g. methyl o-bromobenzoate, 13.9 g. 2,3-dichloroaniline, 0.3 g. anhydrous cupric acetate, 11 g. anhydrous potassium acetate, and 50 g. naphthalene is heated at 210–220° C. for ten hours and cooled. The solidified reaction mixture is crushed and stirred with 750 ml. hot petroleum ether until no more material will dissolve. The insoluble material is removed by filtration and the petroleum ether solution is evaporated to dryness to give a residue of the methyl ester of N-(2,3-dichlorophenyl)anthranilic acid mixed with naphthalene. The naphthalene is removed by fractional distillation in vacuo and the residue of the methyl ester of N-(2,3-dichlorophenyl)anthranilic acid is crystallized several times from petroleum ether; M.P. 86–88° C.

*Starting materials*

The N-acylated diphenylamine compounds used as starting materials in the practice of the invention can be prepared in a number of ways. For example, an anilide of the formula

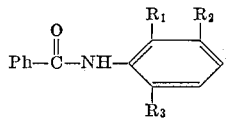

can be reacted with phosphorus pentachloride to produce a benzimidoyl chloride of the formula

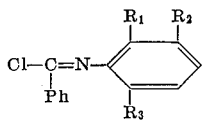

and the benzimidoyl chloride reacted with a phenol compound of the formula

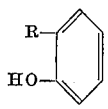

or an alkali metal salt thereof and the resulting imido-ester of the formula

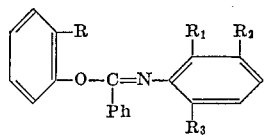

subjected to intramolecular rearrangement by heating; where Ph, R, $R_1$, $R_2$, and $R_3$ have the same significance as given previously.

Some of the N-acylated diphenylamine compounds can also be prepared by reacting an N-acylated aniline compound of the formula

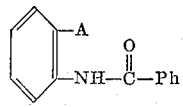

with thionyl chloride to obtain the corresponding imino chloride of the formula

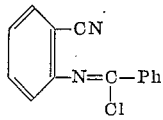

reacting the imino chloride with an alkali metal salt of a phenol of the formula,

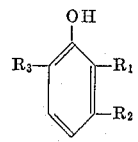

and rearranging the resulting product with heat; where A is a cyano or carboxamide group and Ph, $R_1$, $R_2$, and $R_3$ have the same significance as given above.

We claim:
1. A compound of the formula

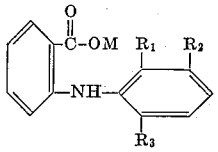

where $R_1$ is a member of the class consisting of halogen and methyl; $R_2$ is a member of the class consisting of halogen, methyl, ethyl, lower alkoxy, benzyloxy and $\beta,\beta,\beta$-trifluoroethoxy, at least one of said $R_1$ and $R_2$ being halogen; $R_3$ is a member of the class consisting of hydrogen, halogen, and methyl; and M is a member of the class consisting of hydrogen, pharmaceutically-acceptable cations, and lower alkyl; the halogen herein being selected from the class consisting of fluorine, chlorine, and bromine.

2. N-(2,6-dichloro-3-methylphenyl)anthranilic acid.
3. N-(2,6-dichloro-3-ethylphenyl)anthranilic acid.
4. N-(2,6-dichloro-3-lower alkoxyphenyl)anthranilic acid.
5. N-(2,6-dichloro-3-methoxyphenyl)anthranilic acid.
6. N-(2,3-dichlorophenyl)anthranilic acid.
7. N-(2,3,6-trichlorophenyl)anthranilic acid.

References Cited by the Examiner

Elson et al.: J. Chem. Soc. (1931), pp. 294–305 relied on.

Fries et al.: Ann., 509 (1934), pp. 88 to 92 relied on.

LORRAINE A. WEINBERGER, *Primary Examiner.*

L. A. THAXTON, *Assistant Examiner.*